US011585927B2

(12) United States Patent
Hebert et al.

(10) Patent No.: US 11,585,927 B2
(45) Date of Patent: Feb. 21, 2023

(54) LIDAR FOR HETERODYNE DETECTION BY A LOCAL OSCILLATOR AND A DUAL PROBING BEAM, AT ONE OR SEVERAL SIMULTANEOUS FREQUENCY(IES), AND LIDAR DETECTION METHOD BY DUAL HETERODYNING DETECTION

(71) Applicants: OFFICE NATIONAL D'ETUDES ET DE RECHERCHES AEROSPATIALES (ONERA), Palaiseau (FR); Centre National d'Etudes Spatiales, Paris (FR)

(72) Inventors: Philippe Hebert, Toulouse (FR); Francois Lemaitre, St Orens de Gameville (FR); Nicolas Cezard, Paris (FR)

(73) Assignees: OFFICE NATIONAL D'ETUDES ET DE RECHERCHES AEROSPATIALES, Palaiseau (FR); CENTRE NATIONAL D'ETUDES SPATIALES, Paris (FR)

( * ) Notice: Subject to any disclaimer, the term of this patent is extended or adjusted under 35 U.S.C. 154(b) by 907 days.

(21) Appl. No.: 16/446,305

(22) Filed: Jun. 19, 2019

(65) Prior Publication Data
US 2019/0383940 A1 Dec. 19, 2019

(30) Foreign Application Priority Data
Jun. 19, 2018 (FR) ..................................... 18/55413

(51) Int. Cl.
*G01S 17/34* (2020.01)
*G01J 3/02* (2006.01)
*G02B 23/24* (2006.01)

(52) U.S. Cl.
CPC ............. *G01S 17/34* (2020.01); *G01J 3/0205* (2013.01); *G02B 23/2407* (2013.01)

(58) Field of Classification Search
CPC ........ G01S 17/34; G01S 17/95; G01S 7/4818; G01S 7/484; G01J 3/0205; G02B 23/2407; Y02A 90/10; G01N 21/3504
See application file for complete search history.

(56) References Cited

U.S. PATENT DOCUMENTS
2018/0073856 A1 3/2018 Cundiff et al.

FOREIGN PATENT DOCUMENTS
FR 3027116 4/2016
FR 3039331 1/2017

OTHER PUBLICATIONS

Xianyu Zhao, Xinghua Qu, Fumin Zhang, Yuhang Zhao, and Guoqing Tang, "Absolute distance measurement by multi-heterodyne interferometry using an electro-optic triple comb," Opt. Lett. 43, 807-810 (2018) (Year: 2018).*

* cited by examiner

*Primary Examiner* — Hwa Andrew Lee
(74) *Attorney, Agent, or Firm* — Burris Law, PLLC

(57) ABSTRACT

A LIDAR-type device for a remote spectroscopy of a matter includes an optical emission channel that includes a laser source and an optical waves frequency generator to generate a first comb, a second comb, and a local comb. Each comb includes at least one stripe. A transmit telescope emits an emission signal. A reception channel includes a receive telescope that receives a signal reflected by the matter traversed by the emission signal and a detection system that detects a first beat signal of the at least one stripe of the local comb with the corresponding first stripe of the first reflected comb, a second beat signal of the at least one stripe of the local comb with the corresponding second stripe of the (Continued)

second reflected comb, and a third beat signal of the at least one first beat signal with the at least one second beat signal.

17 Claims, 3 Drawing Sheets

LIDAR FOR HETERODYNE DETECTION BY A LOCAL OSCILLATOR AND A DUAL PROBING BEAM, AT ONE OR SEVERAL SIMULTANEOUS FREQUENCY(IES), AND LIDAR DETECTION METHOD BY DUAL HETERODYNING DETECTION

CROSS-REFERENCE TO RELATED APPLICATIONS

This application claims priority to and the benefit of FR 18/55413 filed on Jun. 19, 2018. The disclosures of the above applications are incorporated herein by reference.

FIELD

The present disclosure relates to the field of detection and measurement lasers, or LIDAR, applied to the probing of the atmosphere by spectroscopy.

BACKGROUND

The statements in this section merely provide background information related to the present disclosure and may not constitute prior art.

It is known to use a laser source configured, from a first narrow spectral band light emission, centered on a first frequency, to generate a first light wave comprising a first plurality of spectral components, each component covering a band, or stripe, which is a narrow spectral band or stripe centered on a frequency different from the other components, such that, in the frequency space, the spectral composition of the light wave has the shape of a first spectral comb, the height of each stripe of the comb corresponding to the light energy of the spectral stripe of the first light emission distributed over each stripe of the comb.

It is also known to generate, from the first light emission, not only a first light luminous wave, but also and simultaneously generate a second light wave, which is coherent with the first one, and comprising like the first light wave, a second plurality of spectral components, forming a second spectral comb, each spectral stripe of the second comb being associated with a spectral stripe of the first comb slightly shifted in frequency relative thereto.

It is finally known to emit the first and the second light comb in the direction of a target, for example a portion of the atmosphere, and then to pick up the signal sent back by this target so as to make beat, i.e. to modulate the received signal corresponding to a stripe of the first comb with the signal received and associated with the stripe of the second comb, then to filter the radiofrequency (RF) component of the modulated signal. This modulation occurs for each pair of stripes (first comb-second comb).

One drawback of this device is that, for each emitted stripe, the signal received from the target is attenuated by the round trip of the wave between the emitter and the receiver, therefore of a low level if this distance is large. The power of the filtered RF component is in turn twice as attenuated as the signal received from each stripe considered individually; the signal-to-noise ratio of the signal is therefore very degraded if the experimental conditions make the photon noise not dominant.

One improvement in the case of a single or double emission stripe and a single light wave emitted to the target, consists in mixing its feedback with the stripe of a local oscillator in order to take advantage of the power of the latter, which has not undergone the attenuation over a long distance. This device called «heterodyne detection» or «coherent detection» can be limited in the optical frequencies by the coherence length of the laser source, which results in a random phase-shift between the feedback light wave and the local oscillator. This phase-shift randomly modulates the radiofrequency signal, which requires performing an averaging of several random intensity measurements, with an unfavorable statistical standard deviation, and therefore a degraded final signal-to-noise ratio.

These and other issues are addressed by the present disclosure.

SUMMARY

In one form, the present disclosure is directed toward a LIDAR-type device for a remote spectroscopy of a matter. The LIDAR-type device comprises:
an optical emission channel including:
a laser source adapted to emit a laser stripe at a generating frequency;
an optical waves frequency generator adapted to generate, from the emitted laser stripe:
a first comb comprising at least one first stripe, the at least one first stripe having a stable frequency derived from the generating frequency; and
a second comb comprising at least one second stripe, the at least one second stripe having a stable frequency derived from the generating frequency; and
a local comb comprising at least one local stripe, the at least one local stripe having a stable frequency derived from the generating frequency;
a transmit telescope adapted to emit an emission signal towards the matter traversed by the emission signal, the emission signal comprising the first and the second comb;
a reception channel comprising:
a receive telescope adapted to receive a signal reflected by the matter traversed by the emission signal, the reflected signal comprising:
a first reflected comb, the first reflected comb comprising at least one first stripe reflected by the matter traversed by the at least one first stripe of the first comb of the emission signal,
a second reflected comb, the second reflected comb comprising at least one second stripe reflected by the matter traversed by the at least one second stripe of the second comb of the emission signal;
each stripe of the local comb being associated with a corresponding first stripe of the first reflected comb, and with a corresponding second stripe of the second reflected comb;
a detection system configured to detect:
at least one first beat signal, of the at least one stripe of the local comb with the corresponding first stripe of the first reflected comb; and
at least one second beat signal, of the at least one stripe of the local comb with the corresponding second stripe of the second reflected comb; and
at least one third beat signal of the at least one first beat signal with the at least one second beat signal.

In accordance with these arrangements, each stripe of the local comb, whose signal is not attenuated by a round trip from the emitter to the receiver, is mixed with the corresponding first stripe of the first reflected comb and the corresponding second stripe of the second reflected comb;

The possible phase-shift between each stripe of the local comb and, on the one hand the corresponding first stripe, on the other hand the corresponding second stripe, are the same at all times because the stripes of the first and second combs undergo the same disturbances with regards to the stripes of the local comb; thus, a third beat signal reduces or eliminates the common phase-shift and cancels the random modulation effect specific to the heterodyne detection of the state of the art. It allows taking full advantage of the power of the local oscillator; it thus allows a significant improvement of the signal-to-noise ratio, despite the attenuation related to the division of the energy of each comb by two, in comparison with the energy which would have been that of one single comb, and despite the losses related to the heterodyne mixture. This gain is a function of the ratio between the power of the local comb and the power of the reflected combs and the bandwidth reduction allowed by the low value of the frequency of the $3^{rd}$ beat.

The present disclosures comprises one or more of the following features, considered alone or in combination.

According to one form, the frequency generator is configured to generate the first comb separately from the second comb.

According to another form, the frequency generator comprises a first acousto-optic modulator and a second acousto-optic modulator, the frequency generator being configured to generate the first comb formed at the output of the first acousto-optic modulator separately from the second comb formed at the output of the second acousto-optic modulator.

According to yet another form, each of the first comb, the second comb and the local comb comprises a number of stripes greater than or equal to 1, preferably greater than or equal to 2, preferably comprised between 2 and 13.

According to one form, each of the first comb, the second comb and the local comb comprises a number of stripes greater than or equal to 2, preferably comprised between 2 and 13.

With this arrangement, it is possible to probe the matter simultaneously at several points of the spectrum in the absorption spectral band of the considered matter. The different stripes of the emission signal (first and second comb) will simultaneously traverse the same area of the probed matter and will simultaneously produce the different reflected stripes that will compose the reflected signal. Thus, a small uncertainty on the overall frequency positioning of the emission signal can be compensated by the large frequency sampling, whose frequency step is well controlled by the technology described above, obtained by the emission of several simultaneous stripes having all different frequencies within each comb. A refocusing on the absorption frequency will be possible by processing after reception. This advantage, specific to the LIDAR with a frequency comb, is made even more interesting that, when combined with the other features of the present disclosure, the signal-to-noise ratio is considerably improved. Thus, these arrangements allow not only taking advantage of the improvement of the signal-to-noise ratio provided by the local comb, but also more effectively reducing or eliminating the biases induced by the non-simultaneity of the measurements performed with a conventional LIDAR DIAL.

According to one form, the frequencies of the stripes of the local comb are regularly spaced, around the generating frequency, with a local step, the value of the local step being comprised between 500 MHz and 2000 MHz, preferably equal to 1000 MHz.

According to another form, the generating frequency is an optical frequency, preferably located around 200 THz, which means 200 000 GHz.

According to one form, the frequencies of the stripes of the first comb are regularly spaced according to a first step, around a first central frequency equal to the sum of the generating frequency and a first frequency shift.

According to another form, the first frequency shift is obtained via a first acousto-optic modulator around a value equal to 100 MHz.

According to one form, the frequencies of the stripes of the second comb are regularly spaced according to a second step, around a second central frequency equal to the sum of the generating frequency and a second frequency shift.

According to another form, the first and second frequency shifts are obtained respectively via first and second acousto-optic modulators, preferably around a value equal to about 100 MHz.

According to yet another form, the value of the first step and the value of the second step are equal to the sum of the value of the local step with a deviation.

According to one form, the value of the deviation between the value of the steps of the first and the second comb on the one hand, and the value of the step of the local comb on the other hand, is about 10 MHz.

According to another form, the detection system comprises a digital processing unit configured to process the at least one first beat signal and the at least one second beat signal so as to generate at least one third beat signal.

This second beat level may be operated, for example, digitally and may consist of a spectral filtering of the heterodyne time signal and the squaring thereof. A new filtering isolates the frequency of the new beat carrying the spectroscopic information looked for in the targeted matter.

According to one form, the digital processing unit comprises:

an analog-to-digital converter configured to digitize a time signal comprising the at least one first beat signal and the at least one second beat signal, so as to generate a digital signal;

a first calculating unit configured to calculate a first digital spectrum of the digital signal;

a first filtering unit configured to separate different spectral components of the previously calculated digital spectrum;

a second calculating unit configured to convert, in parallel, each spectral component separated by the first filtering unit from the spectral domain to the time domain, so as to generate, at least one time component comprising at least one first time component of the at least one first beat signal and at least one second time component of the at least one second beat signal, each first time component of the at least one time component and each second time component of the at least one second time component corresponding to a stripe of the local comb;

a mixer configured to make beat, in parallel for each stripe of the local comb, the corresponding first time component of the at least one first beat signal and the corresponding second time component of the at least one second beat signal, so as to generate, a third beat signal of the at least one third beat signal corresponding to each stripe of the local comb;

a third calculating unit configured to calculate a digital spectrum of each third beat signal of the at least one third beat signal, in parallel for each third beat signal;

a second filtering unit configured to isolate, within each third beat signal of the at least one third beat signal, a low-frequency spectral component.

According to these arrangements, the detection of the third beat signal by the detection system can be performed digitally.

According to one form, each final pair of signals corresponds to a stripe of the local comb and a stripe of the first comb as well as a stripe of the second comb. Each pair of signals comprises a first beat signal of a stripe of the local comb with a corresponding first stripe of the first reflected comb, and a second beat signal of the stripe of the local comb with the corresponding second stripe of the second reflected comb.

According to another form, the third beat signal is filtered around a frequency equal to an absolute value of a difference between the first frequency shift and the second frequency shift.

According to these arrangements, the filtering of the third beat signal allows isolating the signal carrying the spectroscopic information looked for, while taking advantage of the improved signal-to-noise ratio.

According to another form, the value of the third intermediate frequency is about 1 MHz.

According to one form, the present disclosure is also directed toward a LIDAR detection method for a remote spectroscopy of a matter, comprising the following steps of:

emitting, by a laser source, a laser stripe at a generating frequency;

generating, by a frequency generator, from the laser stripe:

a first comb comprising at least one first stripe, the at least one first stripe having a stable frequency derived from the generating frequency; and a second comb comprising at least one second stripe, the at least one second stripe having a stable frequency derived from the generating frequency; and a local comb comprising at least one local stripe, the at least one local stripe having a stable frequency derived from the generating frequency;

emitting by a transmit telescope an emission signal towards the matter traversed by the emission signal, the emission signal comprising the first and the second comb;

receiving by a receive telescope:

a signal reflected by the matter traversed by the emission signal, the reflected signal comprising:

a first reflected comb, the first reflected comb comprising at least one first stripe reflected by the matter traversed by the at least one first stripe of the first comb of the emission signal, a second reflected comb, the second reflected comb comprising at least one second stripe reflected by the matter traversed by the at least one second stripe of the second comb of the emission signal;

each stripe of the local comb being associated with a corresponding first stripe of the first reflected comb, and with a corresponding second stripe of the second reflected comb;

detecting by a detection system:

at least one first beat signal, of the at least one stripe of the local comb with the corresponding first stripe of the first reflected comb; and at least one second beat signal, of the at least one stripe of the local comb with the corresponding second stripe of the second reflected comb; and a third beat signal of the at least one first beat signal with the at least one second beat signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
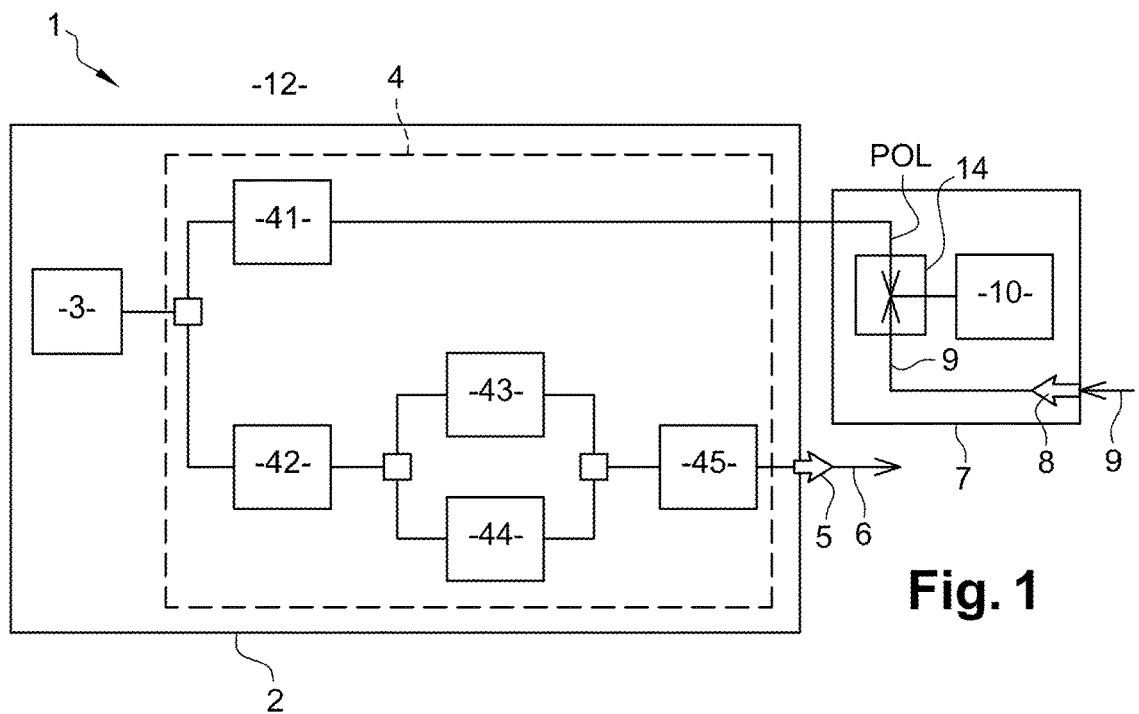
FIG. 1 is a schematic view of a remote spectroscopy device according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, the remote spectroscopy device 1 comprises an optical emission channel 2 and an optical reception channel 7.

The optical emission channel 2 comprises a laser source 3 configured to emit a laser stripe at a generating frequency FG; the laser source is connected to a frequency generator 4 by an optical fiber.

In a general manner, the transmission of the optical signals between the different optical components of the device 1 is performed by the optical fiber, which provides maintenance of the polarization of the transmitted optical signals.

At the input of the frequency generator 4, the laser beam is divided into a first beam which is led to a first electro-optic modulator 41 configured to generate a first local comb POL. This first local comb comprises at least one local stripe, each stripe having a stable frequency derived from the generating frequency FG.

Figure 2:
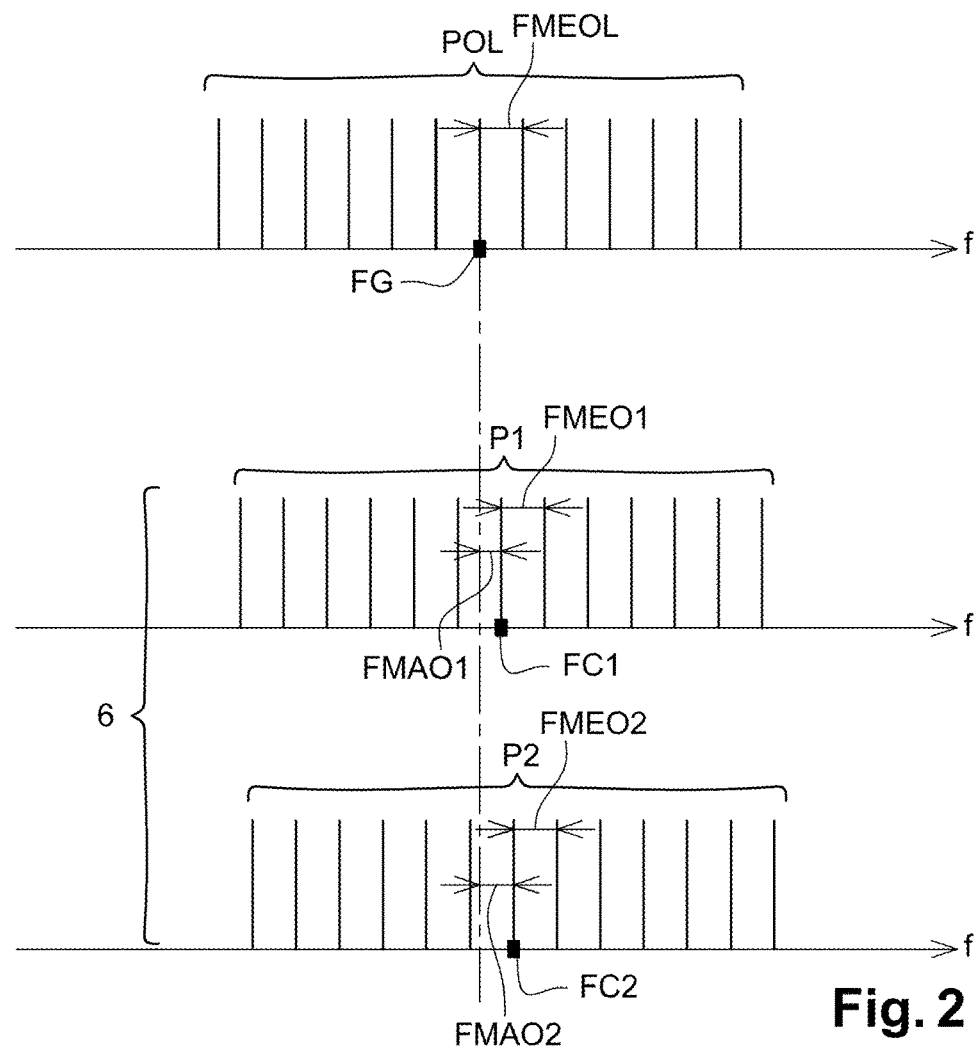
FIG. 2 is a schematic view of the frequency spectrum of the different combs.

According to one form, the generating frequency is an optical frequency, preferably close to 200 THz, and the local comb comprises a number of stripes greater than 2, preferably comprised between 2 and 13; the frequencies of the stripes are distributed around the generating frequency FG, and are shifted from each other by a predetermined value FMEOL, comprised between 500 MHz and 2000 MHz, preferably equal to 1000 MHz, as illustrated in FIG. 2, in which 13 stripes having frequencies regularly distributed on either side of the generating frequency are represented along an axis of frequencies f.

At the input of the frequency generator 4, the laser stripe is simultaneously divided into a second beam which is led to a second electro-optic modulator 42 which, in combination with a first acousto-optic modulator 43 and a second acousto-optic modulator 44, is configured to generate a first comb P1 formed at the output of the first acousto-optic modulator 43, separated from a second comb P2 formed at the output of the second acousto-optic modulator 44. These first and second combs P1, P2 comprise at least one stripe, each stripe having a stable frequency derived from the generating frequency FG.

Preferably, according to one form illustrated in FIG. 2, each of the first and second combs P1, P2 comprises a number of stripes identical to the number of stripes of the local comb, i.e. greater than 2, preferably comprised between 2 and 13; the frequencies of the stripes of each of the combs P1, P2 are distributed around a central frequency FC1, FC2, derived from the generating frequency FG, and are shifted from each other respectively by a value FMEO1 for the first comb P1, FMEO1 being, for example, comprised between 500 MHz and 2000 MHz, preferably equal to 1000 MHz, and a value FMEO2 for the second comb P2, FMEO2 being for example comprised between 500 MHz and 2000 MHz, preferably equal to 1000 MHz.

According to one form, the central frequency FC1 of the first comb and the central frequency FC2 of the second comb are shifted from the generating frequency FG by a value respectively FMAO1, FMAO2 determined respectively by each of the two acousto-optic modulators 43, 44.

According to one form, the value of the shift FMAO1 between the generating frequency, i.e. the central frequency of the local comb, and the central frequency of the first comb P1, and the value of the shift FMAO2 between the generating frequency, and the central frequency of the second comb P2, are preferably set around 100 MHz, for example 110 MHz for FMAO1 and 111 MHz for FMAO2.

Each stripe of the local comb is associated with a corresponding first stripe of the first comb P1, typically that of the stripes of the first comb whose frequency is closest to the frequency of the stripe considered on the local comb; similarly, each stripe of the local comb is associated with a corresponding second stripe of the second comb P2, typically that of the stripes of the second comb whose frequency is closest to the frequency of the stripe considered on the local comb;

According to one form, the value of the first step FMEO1 of the first comb P1 and the value of the second step FMEO2 of the second comb P2, are equal to each other, and differ from the value of the local step FMEOL of the local comb by a deviation value D. According to one form of the present disclosure, the value of the deviation is about 10 MHz.

According to one particular form, the values of the following parameters are thus set to define the local comb POL and the first and second combs P1, P2:

Deviation D=10.6 MHz

Step FMEOL of the local comb: FMEOL=889.4 MHz

Step FMEO1 of the first comb P1: FMEO1=FMEOL+D=900 MHz

Step FMEO2 of the second comb P2: FMEO2=FMEOL+D=900 MHz

Shift FMAO1 between the generating frequency, i.e. the central frequency of the local comb, and the central frequency of the first comb P1: FMAO1=110 MHz Shift FMAO2 between the generating frequency, i.e. the central frequency of the local comb, and the central frequency of the second comb P2: FMAO2=111 MHz.

According to this particular form, given as an example, the deviations, expressed in MHz, between the generating frequency and the frequencies of each of the 13 stripes that compose the local comb POL, as distributed around the stripe of order 0 (at the generating frequency), are summarized in the second column POL of Table 1 below.

TABLE 1

| D | 10.6 MHz |
|---|---|
| FMEOL | 889.4 MHz |
| FMEO1, FMEO2 | 900 MHz |
| FMAO1 | 110 MHz |
| FMAO2 | 111 MHz |

| ORDER | POL | P1 | P2 | B(POL, P1) | B(POL, P2) | Beat B(POL, P1) B(POL, P2) | Average B(POL, P1) B(POL, P2) |
|---|---|---|---|---|---|---|---|
| −6 | −5336.4 | −5290 | −5289 | 46.40 | 47.40 | 1 | 46.90 |
| −5 | −4447 | −4390 | −4389 | 57.00 | 58.00 | 1 | 57.50 |
| −4 | −3557.6 | −3490 | −3489 | 67.60 | 68.60 | 1 | 68.10 |
| −3 | −2668.2 | −2590 | −2589 | 78.20 | 79.20 | 1 | 78.70 |
| −2 | −1778.8 | −1690 | −1689 | 88.80 | 89.80 | 1 | 89.30 |
| −1 | −889.4 | −790 | −789 | 99.40 | 100.40 | 1 | 99.90 |
| 0 | 0 | 110 | 111 | 110.00 | 111.00 | 1 | 110.50 |
| 1 | 889.4 | 1010 | 1011 | 120.60 | 121.60 | 1 | 121.10 |
| 2 | 1778.8 | 1910 | 1911 | 131.20 | 132.20 | 1 | 131.70 |
| 3 | 2668.2 | 2810 | 2811 | 141.80 | 142.80 | 1 | 142.30 |
| 4 | 3557.6 | 3710 | 3711 | 152.40 | 153.40 | 1 | 152.90 |
| 5 | 4447 | 4610 | 4611 | 163.00 | 164.00 | 1 | 163.50 |
| 6 | 5336.4 | 5510 | 5511 | 173.60 | 174.60 | 1 | 174.10 |

Similarly, the deviations, expressed in MHz, between the generating frequency FG and the frequencies of each of the 13 stripes that compose the first comb P1, as distributed around the stripe of order 0 (at the generating frequency), are summarized in the third column P1 of Table 1.

Similarly, the deviations, expressed in MHz, between the generating frequency and the frequencies of each of the 13 stripes that compose the second comb P2, as distributed around the stripe of order 0 (at the generating frequency), are summarized in the fourth column P2 of Table 1.

The frequencies that appear on the same row of Table 1 are, on the one hand, on the column POL, the frequency of a stripe of the local comb, and, on the other hand, on the columns P1 and P2, the frequencies of the corresponding first stripe and second stripe belonging respectively to the first and second combs P1, P2, that are associated with said stripe of the local comb.

The first comb P1 and the second comb P2 simultaneously formed separately, respectively at the output of the first acousto-optic modulator 43 and the second acousto-optic modulator 44, compose, after the spatial superposition thereof by means of a coupler preferably a polarization maintaining coupler, an optical signal sent, via an optical fiber, to an optical amplifier 45 configured to amplify the power of the signal that it receives and thus to generate an optical emission signal 6 that will be emitted by a transmit telescope 5 towards the matter that must be remotely probed by spectroscopy.

According to one form, the optical amplifier 45 will be of the EDFA («Erbium Doped Fiber Amplifier») type or the YDFA (Ytterbium) type, known per se in the state of the art.

The transmit telescope 5, also known in the state of the art, is configured to receive the amplified signal 6 and to emit it towards the matter to be probed, such that the emission signal 6 traverses the matter to be probed and is then reflected on a hard target, thus generating a reflected signal 9 that is sent back to a receive telescope 8.

The optical reception channel 7 comprises a receive telescope 8, an optical coupling module 14, and a detection system 10, these components being connected by an optical fiber link, as indicated above.

According to one form, the transmit telescope 5 and the receive telescope 7 may be in the form of a single component, in the case of a configuration called monostatic configuration.

The receive telescope 7 is configured to receive the reflected signal 9, after the emission signal 6 has traversed the matter to be probed, the reflected signal 9 comprising:

a first reflected comb, the first reflected comb comprising at least one first stripe reflected after traversing the matter by the at least one first stripe of the first comb P1 of the emission signal 6, a second reflected comb, the second reflected comb comprising at least one second stripe reflected after traversing the matter by the at least one second stripe of the second comb P2 of the emission signal 6.

In the same way as each stripe of the local comb is associated with a corresponding first stripe of the first comb P1, and with a corresponding second stripe of the second comb P2, each stripe of the local comb is thus associated with a corresponding first stripe of the first reflected comb, i.e. with the corresponding stripe of the first comb P1 as reflected after traversing the matter by the emission signal 6, and with a corresponding second stripe of the second reflected comb, i.e. with the corresponding stripe of the second comb P2 as reflected after traversing the matter by the emission signal 6.

The coupling module 14 is configured to couple the signal of the local comb POL and the reflected signal 9 and to send the coupled signal to the detection system 10.

According to one form, the detection system 10 comprises a photodetector configured to produce:

at least one first beat signal 11, of the at least one stripe of the local comb with the corresponding first stripe of the first reflected comb; and at least one second beat signal 12, of the at least one stripe of the local comb with the corresponding second stripe of the second reflected comb;

According to one form, the photodetector thus detects and produces a first optical beat level in which at least one first heterodyne beat signal 11 is generated between each stripe of the local comb POL and the corresponding first stripe of the first reflected comb composing the reflected signal 9, as well as an at least one second heterodyne beat signal 12 between each stripe of the local comb POL and the corresponding second stripe of the second reflected comb also composing the reflected signal 9.

The at least one first beat signal 11 comprises, for each stripe of the local comb, a first beat signal between the stripe of the local comb and the corresponding first stripe of the first reflected comb P1. Similarly, the at least one second beat signal 12 comprises, for each stripe of the local comb, a second beat signal between the stripe of the local comb and the corresponding first stripe of the second reflected comb P2.

It is known to take an interest more particularly, within each beat signal, in the intermediate frequency signal equal to the difference of the frequencies of the coupled signals.

Thus, according to one form corresponding to the values of the parameters set above, as an example, in order to define the local comb POL and the first and second combs P1, P2 according to Table 1 above, the same Table 1 provides in column B (POL, P1) the intermediate frequencies of the signals that compose each first beat signal 11 of the different stripes of the local comb with the corresponding stripes of the first reflected comb which partly compose the reflected signal 9; the same Table 1 provides in column B (POL, P2) the intermediate frequencies of the signals that compose each second beat signal 12 of the different stripes of the local comb with the corresponding stripes of the second reflected comb, which also compose the reflected signal 9.

Figure 3:
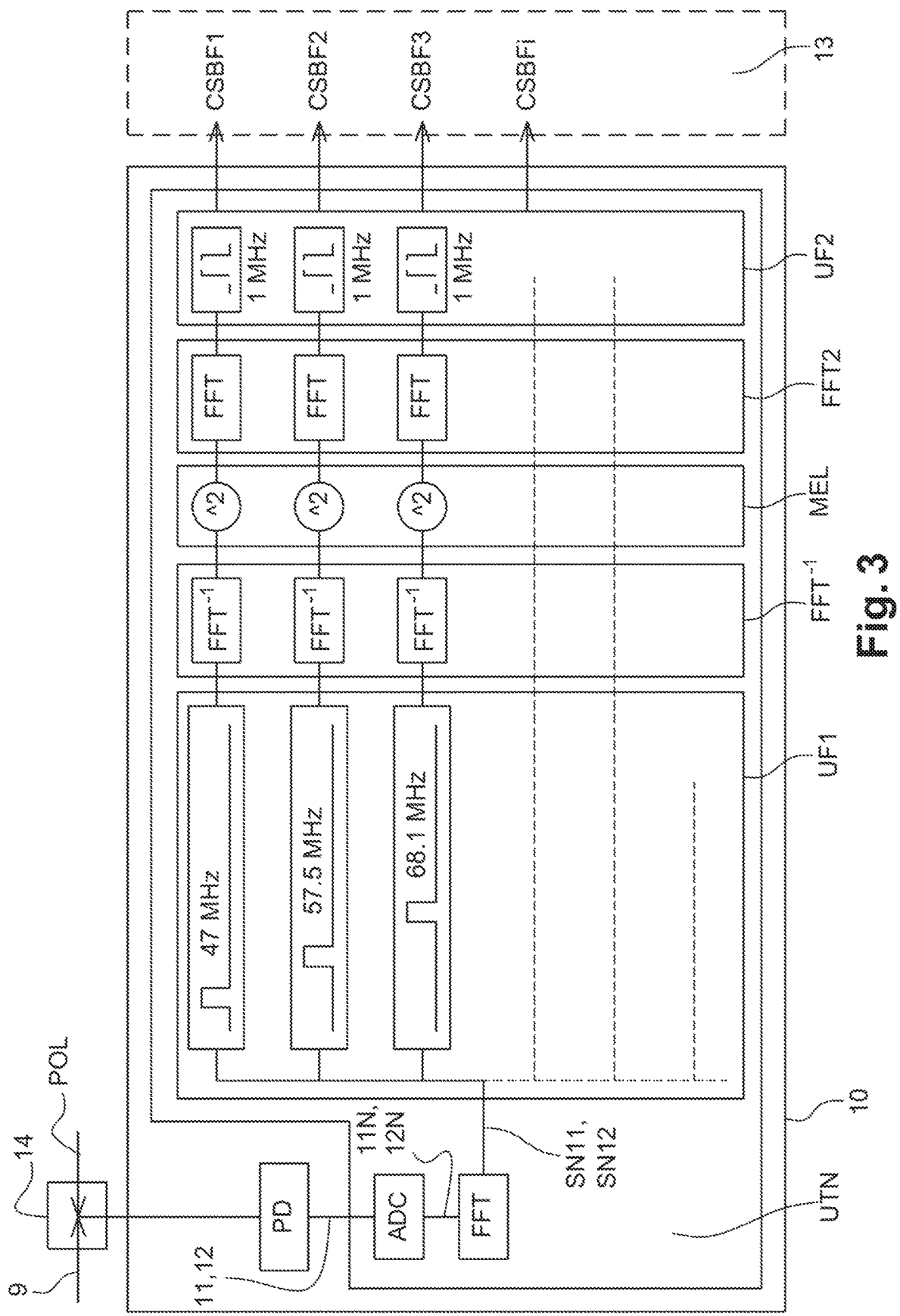
FIG. 3 is a schematic view of a digital form of a portion of the detection system.
Figure 4:
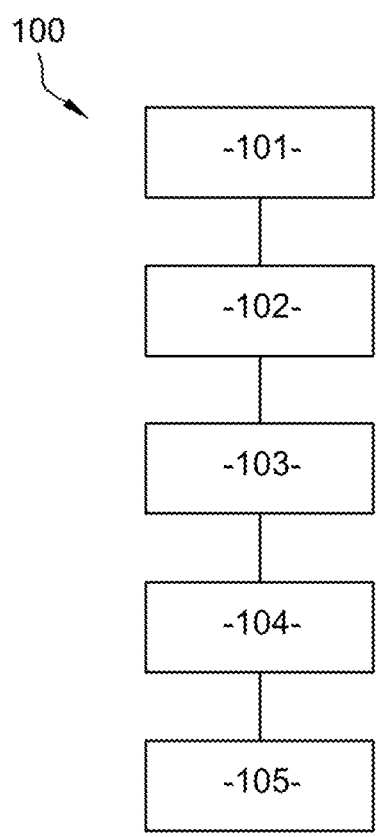
FIG. 4 is a simplified representation of the different steps of the method according to the present disclosure.

As illustrated in FIG. 3, the detection system 10 is also configured to make beat, in a second electric beat level, and for each stripe of the local comb, the first beat signal, corresponding to this stripe of the local comb, of the at least one first beat signal 11 with the second beat signal, corresponding to this same stripe of the local comb, of the at least one second beat signal 12, in order to thus generate, for each stripe of the local comb, at least one third beat signal 13, the at least one third beat signal 13 comprising as many beat signals CSBF1, CSBF2, CSBF3, ... CSBFi, ... as there are different stripes in the local comb.

For this purpose, for each stripe of the local comb:

the beat signal of the at least one first beat signal 11 is filtered around a frequency equal to the average of the respective frequencies of the stripe of the local comb and the corresponding stripe of the first reflected comb P1, which generates a first filtered beat signal;

similarly, each beat signal of the at least one second beat signal 12 is filtered around a frequency equal to the average of the respective frequencies of the stripe of the local comb and the corresponding stripe of the second reflected comb P2, which generates a second filtered beat signal.

Thus, for each stripe of the local comb a first filtered beat signal and a second filtered beat signal are generated.

Then in a second beat level, these first and second filtered beat signals are mixed in order to beat and generate a third beat signal CSBF1.

This process is repeated so forth as many times as there are stripes in the local combs, P1 and P2, thus generating the sequence of the beat signals CSBF1, CSBF2, CSBF3, ... CSBFi, ... that compose the at least one third beat signal 13.

According to one form, in order to isolate the signal carrying the spectroscopic information looked for, it is necessary to filter, for each stripe of the local comb, the third beat signal 13 around a frequency equal to an absolute value of a difference between the first frequency shift FMAO1 and the second frequency shift FMAO2.

Thus, according to one form corresponding to the values of the parameters set above as an example, in order to define the local comb POL and the first and second combs P1, P2 according to Table 1 above, it appears on the second to last column of Table 1 that by filtering the at least one third beat signal 13 around an intermediate frequency of 1 MHz, the signal carrying the spectroscopic information looked for is isolated, with a maximum signal-to-noise ratio. This improvement of the signal-to-noise ratio is provided by the processing described hereinbefore, and whose digital form has now been described.

According to one form illustrated in FIG. 3, the detection system 10 comprises a digital processing unit UTN configured to process in parallel, for each stripe of the local comb, the at least one first beat signal 11 and the at least one second beat signal 12, so as to generate the at least one third beat signal 13.

According to this form, the digital processing unit UTN comprises:

an analog-to-digital converter ADC configured to digitize a time signal comprising the at least one first beat signal 11 and the at least one second beat signal 12, so as to generate a digital signal 11N, 12N;

a first calculating unit FFT configured to calculate a first digital spectrum SN11, SN12 of the digital signal 11N, 12N;

a first filtering unit UF1 configured to separate different spectral components of the previously calculated digital spectrum SN11, SN12;

a second calculating unit $FFT^{-1}$ configured to convert, in parallel, each spectral component separated by the first filtering unit UF1 from the spectral domain to the time domain, so as to generate, at least one time component comprising at least one first time component of the at least one first beat signal 11 and at least one second time component of the at least one second beat signal 12, each first time component of the at least one time component and each second time component of the at least one second time component corresponding to a stripe of the local comb;

a mixer MEL configured to make beat, in parallel for each stripe of the local comb, the corresponding first time component of the at least one first beat signal 11 and the corresponding second time component of the at least one second beat signal 12, so as to generate, a third beat signal of the at least one third beat signal corresponding to each stripe of the local comb;

a third calculating unit FFT2, configured to calculate a digital spectrum of each third beat signal of the at least one third beat signal, in parallel for each third beat signal;

a second filtering unit UF2 configured to isolate, within each third beat signal of the at least one third beat signal, a low-frequency spectral component CSBF1, CSBF2, CSBF3, . . . CSBFi, . . . .

According to these arrangements, the detection of the third beat signal by the detection system is performed for example digitally. The second beat level reduces or eliminates, at all times, the phase-shifts between the comb P1 and the local oscillator on the one hand, and between the comb P2 and the local oscillator on the other hand, which being the same at the 1st order, cancel each other. This cancels the decorrelation that would otherwise degrade the final heterodyne signal.

The present disclosure also concerns a LIDAR detection method 100 for a remote spectroscopy of a matter, the method comprising the following steps of:

emitting 101, by a laser source 3, a laser stripe at a generating frequency FG;

generating 102 by a frequency generator 4 from the laser stripe:

a first comb P1 comprising at least one first stripe, the at least one first stripe having a stable frequency derived from the generating frequency FG; and a second comb P2 comprising at least one second stripe, the at least one second stripe having a stable frequency derived from the generating frequency; and a local comb POL comprising at least one local stripe, the at least one local stripe having a stable frequency derived from the generating frequency;

emitting 103, by a transmit telescope 5, an emission signal 6 towards the matter traversed by the emission signal 6, the emission signal 6 comprising the first and the second comb;

receiving 104 by a receive telescope 8:

a signal 9 reflected by the matter traversed by the emission signal 6, the reflected signal 9 comprising:

a first reflected comb, the first reflected comb comprising at least one first stripe reflected by the matter traversed by the at least one first stripe of the first comb of the emission signal, a second reflected comb, the second reflected comb comprising at least one second stripe reflected by the matter traversed by the at least one second stripe of the second comb of the emission signal;

each stripe of the local comb being associated with a corresponding first stripe of the first reflected comb, and with a corresponding second stripe of the second reflected comb;

detecting 105 by a detection system 10:

at least one first beat signal 11, of the at least one stripe of the local comb with the corresponding first stripe of the first reflected comb; and at least one second beat signal 12, of the at least one stripe of the local comb with the corresponding second stripe of the second reflected comb; and a third beat signal 13 of the at least one first beat signal with the at least one second beat signal.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A LIDAR-type device for a remote spectroscopy of a matter, the LIDAR type device comprising:

an optical emission channel including:

a laser source configured to emit a laser stripe at a generating frequency;

an optical waves frequency generator including multiple electro-optic modulators and configured to generate, from the emitted laser stripe:

a first comb including at least one first stripe, the at least one first stripe having a stable frequency derived from the generating frequency;

a second comb including at least one second stripe, the at least one second stripe having a stable frequency derived from the generating frequency; and a local comb including at least one local stripe, the at least one local stripe having a stable frequency derived from the generating frequency;

a transmit telescope configured to emit an emission signal towards the matter traversed by the emission signal, the emission signal including the first comb and the second comb;

a reception channel including:
  a receive telescope configured to receive a signal reflected by the matter traversed by the emission signal, the reflected signal including:
    a first reflected comb having at least one first stripe reflected by the matter traversed by the at least one first stripe of the first comb of the emission signal; and
    a second reflected comb having at least one second stripe reflected by the matter traversed by the at least one second stripe of the second comb of the emission signal, wherein each stripe of the local comb is associated with a corresponding first stripe of the first reflected comb and with a corresponding second stripe of the second reflected comb; and
  a detection system including a photodetector and configured to detect:
    at least one first beat signal of the at least one stripe of the local comb with the corresponding first stripe of the first reflected comb;
    at least one second beat signal of the at least one stripe of the local comb with the corresponding second stripe of the second reflected comb; and
    at least one third beat signal of the at least one first beat signal with the at least one second beat signal;
  wherein the detection system is configured to filter the third beat signal around a frequency equal to an absolute value of a difference between a first frequency shift and a second frequency shift.

2. The LIDAR-type device according to claim 1, wherein the optical waves frequency generator is configured to generate, for each of the first comb, the second comb, and the local comb, a number of stripes greater than or equal to 1.

3. The LIDAR-type device according to claim 1, wherein the optical waves frequency generator is configured to generate, for each of the first comb, the second comb, and the local comb, a number of stripes greater than or equal to 2.

4. The LIDAR-type device according to claim 1, wherein the optical waves frequency generator is configured to generate, for each of the first comb, the second comb and the local comb, a number of stripes between 2 and 13.

5. The LIDAR-type device according to claim 3, wherein the optical waves frequency generator is configured to generate the frequencies of the stripes of the local comb that are regularly spaced, around the generating frequency, with a local step, the value of the local step being comprised between 500 MHz and 2000 MHZ.

6. The LIDAR-type device according to claim 4, wherein the optical waves frequency generator is configured to generate the frequencies of the stripes of the local comb that are regularly spaced, around the generating frequency, with a local step, the value of the local step being comprised between 500 MHz and 2000 MHZ.

7. The LIDAR-type device according to claim 3, wherein the optical waves frequency generator is configured to generate the frequencies of stripes of the first comb that are regularly spaced according to a first step, around a first central frequency equal to a sum of the generating frequency and the first frequency shift.

8. The LIDAR-type device according to claim 4, wherein the optical waves frequency generator is configured to generate the frequencies of stripes of the first comb that are regularly spaced according to a first step, around a first central frequency equal to a of the generating frequency and the first frequency shift.

9. The LIDAR-type device according to claim 3, wherein the optical waves frequency generator is configured to generate the frequencies of stripes of the second comb that are regularly spaced according to a second step, around a second central frequency equal to a sum of the generating frequency and the second frequency shift.

10. The LIDAR-type device according to claim 4, wherein the optical waves frequency generator is configured to generate the frequencies of stripes of the second comb that are regularly spaced according to a second step, around a second central frequency equal to a sum of the generating frequency and the second frequency shift.

11. The LIDAR-type device according to claim 7, wherein the optical waves frequency generator is configured to generate the frequencies of stripes of the second comb are regularly spaced according to a second step, around a second central frequency equal to the sum of the generating frequency and the second frequency shift.

12. The LIDAR-type device according to claim 8, wherein the optical waves frequency generator is configured to generate the frequencies of stripes of the second comb that are regularly spaced according to a second step, around a second central frequency equal to the sum of the generating frequency and the second frequency shift.

13. The LIDAR-type device according to claim 9, wherein the optical waves frequency generator is configured such that the value of a first step and the value of the second step are equal to a sum of a value of a local step with a deviation.

14. The LIDAR-type device according to claim 10, wherein the optical waves frequency generator is configured such that a value of a first step and the value of the second step are equal to a sum of a value of a local step with a deviation.

15. The LIDAR-type device according to claim 1, the detection system includes a digital processing unit configured to process the at least one first beat signal and the at least one second beat signal so as to generate at least one third beat signal.

16. The LIDAR-type device according to claim 15, wherein the digital processor comprises:
  an analog-to-digital converter configured to digitize a time signal including the at least one first beat signal and the at least one second beat signal, so as to generate a digital signal;
  a first calculating unit configured to calculate a first digital spectrum of the digital signal;
  a first filtering unit configured to separate different spectral components of a previously calculated digital spectrum;
  a second calculating unit configured to convert, in parallel, each spectral component separated by the first filtering unit from the spectral domain to a time domain, so as to generate, at least one time component comprising at least one first time component of the at least one first beat signal and at least one second time component of the at least one second beat signal, each first time component of the at least one time component and each second time component of the at least one second time component corresponding to a stripe of the local comb;

a mixer configured to make beat, in parallel for each stripe of the local comb, the corresponding first time component of the at least one first beat signal and the corresponding second time component of the at least one second beat signal, so as to generate, a third beat signal of the at least one third beat signal, corresponding to each stripe of the local comb;

a third calculating unit configured to calculate a digital spectrum of each third beat signal of the at least one third beat signal, in parallel for each third beat signal; and a second filtering unit configured to isolate, within each third beat signal of the at least one third beat signal, a low-frequency spectral component.

17. A LIDAR detection method for a remote spectroscopy of a matter, the method comprising:

emitting, by a laser source, a laser stripe at a generating frequency;

generating, by a frequency generator including multiple electro-optic modulators, from the laser stripe:
- a first comb comprising at least one first stripe, the at least one first stripe having a stable frequency derived from the generating frequency;
- a second comb comprising at least one second stripe, the at least one second stripe having a stable frequency derived from the generating frequency; and
- a local comb comprising at least one local stripe, the at least one local stripe having a stable frequency derived from the generating frequency;

emitting, by a transmit telescope, an emission signal towards the matter traversed by the emission signal, the emission signal comprising the first and the second comb;

receiving by a receive telescope:
- a signal reflected by the matter traversed by the emission signal, the reflected signal comprising:
  - a first reflected comb, the first reflected comb comprising at least one first stripe reflected by the matter traversed by the at least one first stripe of the first comb of the emission signal; and
  - a second reflected comb, the second reflected comb comprising at least one second stripe reflected by the matter traversed by the at least one second stripe of the second comb of the emission signal, wherein each stripe of the local comb being associated with a corresponding first stripe of the first reflected comb, and with a corresponding second stripe of the second reflected comb;

detecting by a detection system:
- at least one first beat signal of the at least one stripe of the local comb with the corresponding first stripe of the first reflected comb;
- at least one second beat signal, of the at least one stripe of the local comb with the corresponding second stripe of the second reflected comb; and
- a third beat signal of the at least one first beat signal with the at least one second beat signal; and filtering the third beat signal around a frequency equal to an absolute value of a difference between a first frequency shift and a second frequency shift.

* * * * *